Dec. 31, 1957  C. C. LARSON  2,818,466
JUMP COMPENSATION FOR CONTINUOUS MOTION FILM PROJECTOR
Filed Sept. 14, 1951  2 Sheets-Sheet 2

INVENTOR
C. C. LARSON
BY
ATTORNEY

United States Patent Office 2,818,466
Patented Dec. 31, 1957

2,818,466

JUMP COMPENSATION FOR CONTINUOUS MOTION FILM PROJECTOR

Christian C. Larson, Fort Wayne, Ind., assignor to Farnsworth Research Corporation, Fort Wayne, Ind., a corporation of Indiana Application September 14, 1951, Serial No. 246,556

6 Claims. (Cl. 178—7.2)

This invention relates to an arrangement for correcting undesired picture movements in television transmission systems, and particularly to television transmission systems operating in connection with motion film projectors.

For the projection of motion picture films for television transmission, two types of conventional motion picture projectors are employed. In the first, an intermittent type of motion picture projector, the film is moved intermittently past the film gate, the film being held stationary while a frame is projected, and then being occulted by a shutter while the film is moved into position for the projection of a succeeding picture frame. The chief disadvantages of the intermittent system are that the abrupt intermittent motion of the film subjects it to considerable wear and tear, and further, the sound track which is integral with the film has to be carefully isolated from the intermittent motion of the film to satisfactorily reproduce the sound. In order to overcome these inherent disadvantages of the intermittent projector, the continuous film projector has been developed. In the continuous film projector, the film moves at a uniform speed past the film gate and an optical system is provided for compensating the film movement so that the images of successive picture frames are maintained stationary in the plane of projection. Although the continuous film projector possesses many theoretical advantages over the intermittent projector, in practice satisfactory transmission has been troubled by inaccuracies inherent in the optical system. The inaccuracies are responsible for undesired movements or "jumps" in the projected image of the film. These undesired movements or jumps of the projected images seriously limit the vertical resolution which can be obtained when the system is correctly operating.

An object of this invention is to eliminate the jump occurring in the continuous projector transmission system by providing a unique monitoring system in which the jump is detected and the system compensated to synchronize itself with the jump. As a result, though the film may jump, the jumps will be compensated for in the output signal.

In accordance with the invention, applicant provides an arrangement for correcting undesired picture movements in a motion picture television transmission system comprising a continuous film projector and a source of light for the projector. A supply of film having indicia associated therewith, is passed through the projector and projected on a camera tube. The camera tube includes electrical deflecting means which is connected to the output of a light responsive means; the light responsive means being optically aligned with the indicia on the film. The indicia is positioned, during the projection of its corresponding picture frame, to pass a predetermined quantum of light to the light responsive means during the normal operation of the system and a different quantum of light to the light responsive means upon movement from said position. Therefore, the light responsive means supplies a correcting signal to the deflecting means in response to undesired picture movements thus synchronizing the camera tube with the movements and eliminating them.

According to a more specific arrangement of the invention, applicant provides a camera tube having a photosensitive surface including an aperture. The projector projects an image of the indicia on at least a fixed portion of the aperture so that a predetermined quantum of light is passed to the light responsive means through the aperture and a different quantum of light is passed upon movement of the indicia from its normal poistion with respect to the aperture.

The above mentioned and other features and objects of this invention and the manner of attaining them will become more apparent and the invention itself will be best understood by reference to the following description of an embodiment of the invention taken in conjunction with the accompanying drawings, wherein.

Figure 1:
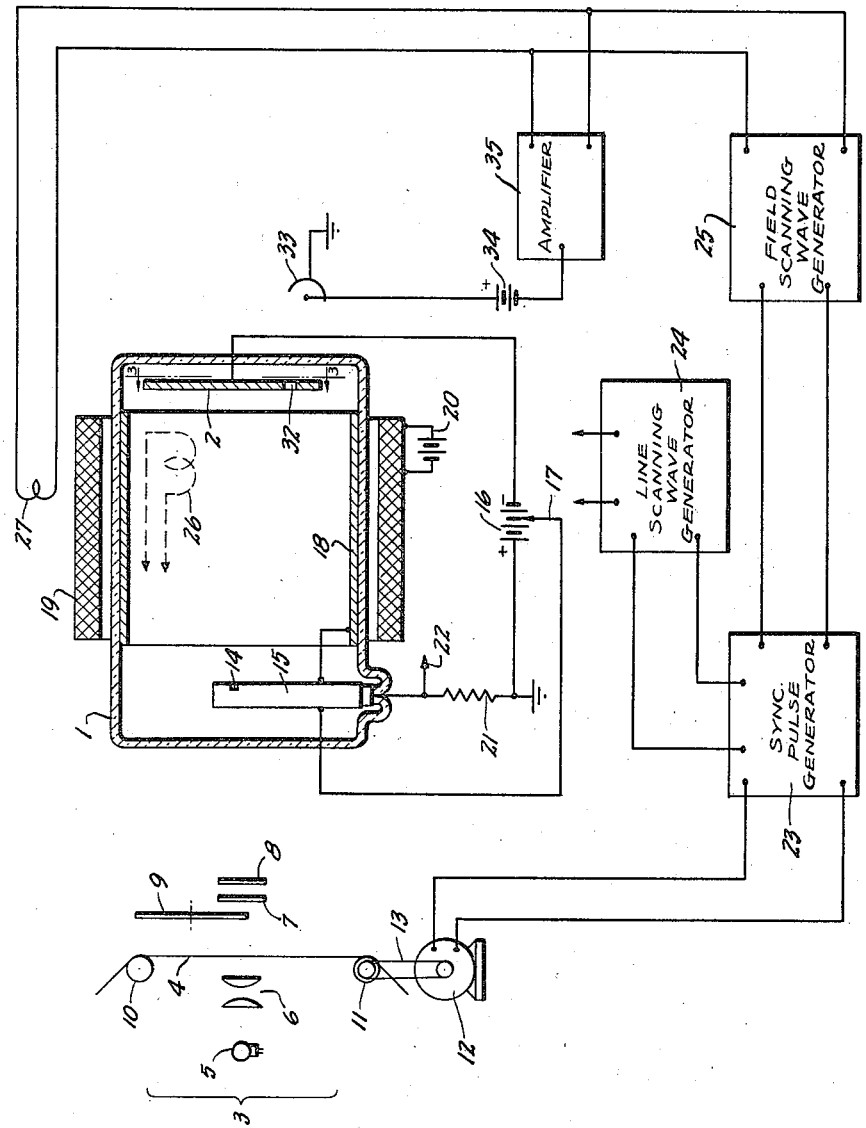
Fig. 1 illustrates a television picture signal generating tube and associated electric circuits.

Referring to Fig. 1, there is illustrated a camera tube which, by way of example, is an image dissector tube 1 having a photosensitive cathode 2. It is to be understood that although the invention is described in connection with the image dissector, other camera tubes having photosensitive cathodes or mosaic surfaces may be satisfactorily employed, e. g. the image orthicon, inconoscope, etc. may be used with good results. A continuous film projector generally indicated at 3 is provided for projecting successive images of continuously moving film 4 on photosensitive cathode 2. Continuous film projector 3 may be of the type described in U. S. Patents 2,323,512 and 2,323,513 to H. S. Bamford, issued July 6, 1943.

In order to understand the invention better, the continuous projector and image dissector will be first described in the manner in which they are usually operated.

The light from light source 5 is projected by lens system 6 through film 4 and focused in the plane of lens discs 7, 8 which cooperate with selector shutter 9 to provide an optical compensating system. Lens discs 7, 8, in turn, focus an image of film 4 on photosensitive cathode 2. The optical system comprising lens discs 7, 8 and selector shutter 9 is arranged for maintaining each successive image of film 4 substantially stationary on photosensitive cathode 2 for a predetermined interval of time.

Film 4 is guided over sprocket gear 10 and drive sprocket 11 which is driven by an electric motor 12 through pulley drive 13. Thus film 4 is advanced at a constant speed across cathode 2. Preferably lens discs 7, 8 and selector shutter 9 are also driven by the electric motor 12 to insure synchronism between the continuous movement of film 4 and the optical compensating system.

The light focused on cathode 2 will liberate photoelectrons which are accelerated toward aperture 14 in anode finger 15. Anode 15 and cathode 2 are provided with a suitable voltage source, for example, battery 16. By means of tap 17, anode 15 is kept at a potential between ground and that of cathode 2. The image dissector tube 1 is provided with an electrically conducting wall coating 18 which is connected to anode 15 for accelerating the photoelectrons toward the aperture 14.

Focusing coil 19 which may be energized by a suitable source, e. g. battery 20, focuses the photoelectrons on aperture 14 of anode 25. Preferably the photoelectrons passing through aperture 14 are multiplied by an electron multiplier contained within anode finger 15 (not illustrated) and the output signal may be developed across a load resistor 21, connected to the collector stage of the multiplier, and obtained over terminal 22.

Electric motor 12 is preferably synchronized by synchronizing pulse generator 23 which is arranged to develop synchronizing pulses at the line and field frequencies. Accordingly, line scanning wave generator 24 and field scanning wave generator 25 are synchronized by pulse generator 23. Line scanning wave generator 24 is connected to line deflecting coils 26 while field scanning wave generator 25 is connected to field deflecting coils 27. Through the combined action of the magnetic deflecting fields developed by deflecting coils 26 and 27, the photoelectrons liberated from cathode 2 are swept past aperture 14 horizontally in accordance with the line scanning frequency and vertically in accordance with the field scanning frequency. The vertical deflection of the photoelectrons, therefore, is in a direction parallel to the direction of movement of film 4.

A discussion of a suitable optical system and the causes of jumps or undesired movements in the transmission system may be found in Patent No. 2,485,594 to C. E. Hallmark, issued October 25, 1949. However it is to be understood that the type of optical system utilized is no limitation to the invention and that other optical systems may be employed with equal facility.

In accordance with the present invention, the field coil of the dissector is pulsed in synchronization with the jump in amplitude and frequency thus eliminating the jump from the projected image.

Figure 2:
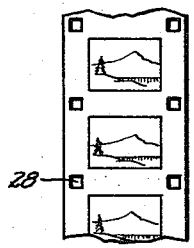
Fig. 2 illustrates typical indexing marks.
Figure 2A:
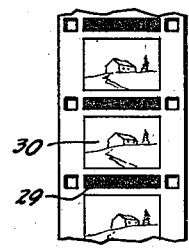
Figure 2B:
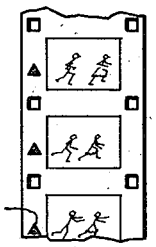

Accordingly, film 4 is provided with an indexing means which may be, in its simplest form, the sprocket holes 28, Fig. 2, located on either side of the film. Other forms of index markings are illustrated by Figs. 2A and 2B; Fig. 2A shows a black border 29 extending laterally on the film and positioned intermediate the picture frames 30, and Fig. 2B shows a triangular indexing mark 31 longitudinally disposed along one side of the film. In each of the indexing marks illustrated the mark is fixedly positioned with respect to its corresponding picture frame. Thus, in addition to projecting the picture frame on cathode 2, the corresponding index marking is also projected. In the following discussion it will be assumed that the index marking illustrated by Fig. 2A is utilized; i. e. the black border 29 positioned intermediate adjacent picture frames.

It is obvious to those skilled in the art that many other different forms of indexing marks may be used and that these three are illustrated only by way of example.

Figure 3:
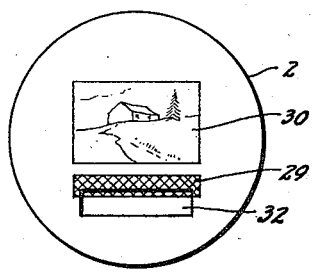
Fig. 3 is a plan view along the lines 3—3 of Fig. 1.

Cathode 2 is provided with an aperture 32, the shape of which preferably corresponds to the type of index marking utilized. Hence in this example the aperture is rectangular in shape and may have substantially the same dimensions as the index marking (see Fig. 3). A photoelectric device 33 is positioned to receive the light that is transmitted by the light source 5 through that portion of the aperture which is not covered by the black border 29. The photoelectric device 33 may be energized by a battery 34, and has its output connected to the field deflecting coils 27 over amplifier 35. The amplifier utilized may be the conventional type and does not require special components or connections.

Figure 4:
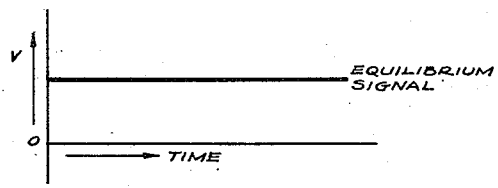
Fig. 4 illustrates with graphs the compensating signal that eliminates jump in the system.
Figure 4A:
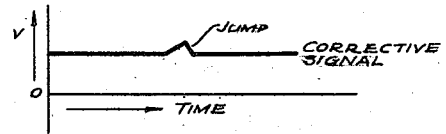
Figure 4B:
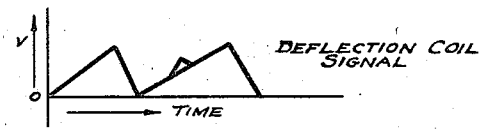

The operation of the system is as follows: the continuous projector, having a single light source, projects an image of the picture frame and corresponding index marking on the photosensitive cathode 2. During normal operation of the system, the images are maintained stationary on the cathode with the index marking covering only a fixed portion of the aperture so that a predetermined quantum of light passes through the aperture and falls on the photoelectric device 33 to establish an equilibrium signal which does not affect the normal operation of the vertical deflecting coil 27. A typical equilibrium signal is indicated by the graph, Fig. 4. At the instant an error occurs in the system causing the images to jump, a different quantum of light is transmitted by the aperture which is detected by the photoelectric device thus producing a correcting signal which is amplified and applied to the deflecting coil to cancel out the effect of the jump by causing the field to also jump in syncronism. The correcting signal is illustrated by the graph in Fig. 4A, which, for example, is for an upward jump. Since the index marking covers only a portion of the aperture, the photoelectric device picks up both direction and frequency of the jump and issues a corresponding correcting signal to the deflecting coil. For example, if the jump was in a downward direction, a greater area of the aperture would be covered by the index marking and less light would pass in a particular time interval, thus energizing the photoelectric device to issue a correcting signal to the vertical deflecting coil. The time interval between the instant the jump occurs and the time it is compensated for is of extremely short duration and occupies a very small portion of the normal deflecting coil signal (Fig. 4B); therefore, the jump is not transmitted by the television system.

Although the invention is described with a cathode having an aperture and the photoelectric device positioned on the outside of the image dissector, it is obvious that an area of a given opacity may be delineated on the cathode and a photoelectric device may be positioned on the inside of the dissector tube to pick up the light reflected from that portion of the delineated area that is not covered by the indexing mark.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In a motion picture television transmission system comprising a continuous film projector including a source of light and a camera tube including electrical deflecting means, said projector normally projecting a steady image of the picture on said tube, an arrangement for correcting undesired picture movements including film, indicia carried by said film, each of said indicia being fixed in position with respect to its corresponding picture frame, light responsive means having its output connected to said deflecting means and optically aligned with said indicia, means for positioning the indicia during the projection of its corresponding picture frame to pass a predetermined quantum of light to said light responsive means during normal operation of said system and a different quantum of light thereto upon movement from said position, whereby said light responsive means supplies a correcting signal to said deflecting means in response to undesired picture movements, said correcting signal having a variable wave form corresponding to the instantaneous character of picture movement, said correcting signal being directly coupled to said deflecting means, and a scanning wave generator connected to said deflecting means and producing a periodic scanning wave, said correcting signal being of shorter duration than said scanning wave and superimposed thereon whereby the resulting wave is non-linear in accordance with said undesired picture movement.

2. In a motion picture television transmission system comprising a continuous film projector including a source of light and a camera tube having a photosensitive surface and electrical deflecting means, said projector normally projecting a steady image of the picture on said surface, an arrangement for correcting undesired picture movements including film, indicia carried by said film, each of said indicia being fixed in position with respect to its corresponding picture frame, the image of said indicia occupying a given position on said surface, light responsive means having its output connected to said deflecting means and optically aligned with the image of said indicia, said light responsive means producing a nonlinear signal corresponding to undesired picture movements, said surface having means cooperating with the position of said indicia image for transmitting a predetermined quantum of light to said light responsive means during normal operation of said system and a different quantum of light thereto upon movement from said position, whereby said light responsive means supplies a correcting signal to said deflecting means in response to undesired picture movements.

3. In a motion picture television transmission system comprising a continuous film projector including a source of light and a camera tube having a photosensitive surface, electrical deflecing means for said tube, said projector normally projecting a steady image of the picture and its corresponding indicia on said surface, an arrangement for correcting undesired picture movements including film, indicia carried by said film, each of said indicia being fixed in position with respect to its corresponding picture frame, said photosensitive surface being provided with an aperture, light responsive means having its output connected to said deflecting means and optically aligned with said indicia image, means for positioning an image of said indicia with respect to said aperture to transmit a predetermined quantum of light to said light responsive means during normal operation of said system and a different quantum of light thereto upon movement from said position, whereby said light responsive means supplies a correcting signal to said deflecting means in response to undesired picture movements.

4. In a motion picture television transmission system comprising a continuous film projector including a source of light, a camera tube having a photo-sensitive cathode and electrical deflecting means for said tube, said projector normally projecting a steady image of the picture and its corresponding indexing means on said cathode, an arrangement for correcting undesired picture movements including film, indexing means longitudinally positioned on said film, each of said indexing means being fixed in position with respect to its corresponding picture frame, said photo-sensitive cathode having an aperture, an amplifier, a photoelectric device adjacent said aperture having its output connected to said deflecting means over said amplifier, the image of said indexing means covering a fixed area of said aperture, the uncovered area of said aperture passing to said photoelectric device a predetermined quantum of light during normal operation of said system and a different quantum of light thereto upon movement from said position, whereby said photoelectric device supplies a correcting signal to said deflecting means in response to undesired picture movements.

5. The system according to claim 4 wherein said light source is a single light source.

6. The system according to claim 4 wherein said indexing means comprises a plurality of opaque borders, each of said borders being positioned intermediate said picture frames and extending laterally on said film.

References Cited in the file of this patent

UNITED STATES PATENTS

| | | |
|---|---|---|
| 2,485,594 | Hallmark | Oct. 25, 1949 |
| 2,523,156 | Somers | Sept. 19, 1950 |
| 2,525,891 | Garman | Oct. 17, 1950 |
| 2,575,445 | Germer | Nov. 20, 1951 |

FOREIGN PATENTS

| | | |
|---|---|---|
| 608,939 | Great Britain | Sept. 23, 1948 |